US011010283B2

(12) United States Patent
Li

(10) Patent No.: US 11,010,283 B2
(45) Date of Patent: May 18, 2021

(54) MOCK-BASED UNIT TEST(S) FOR AN END-TO-END TEST OF A CODE SNIPPET

(71) Applicant: Microsoft Technology Licensing, LLC, Redmond, WA (US)

(72) Inventor: Heheng Li, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 15/345,935

(22) Filed: Nov. 8, 2016

(65) Prior Publication Data

US 2018/0129592 A1 May 10, 2018

(51) Int. Cl.
*G06F 9/44* (2018.01)
*G06F 11/36* (2006.01)

(52) U.S. Cl.
CPC ...... *G06F 11/3684* (2013.01); *G06F 11/3664* (2013.01); *G06F 11/3688* (2013.01)

(58) Field of Classification Search
CPC ............ G06F 11/3612; G06F 11/3684; G06F 11/3688; G06F 9/4488; G06F 8/24
See application file for complete search history.

(56) References Cited

U.S. PATENT DOCUMENTS

| | | | |
|---|---|---|---|
| 8,627,296 | B1 | 1/2014 | Picard |
| 8,799,875 | B2 | 8/2014 | Ziegler et al. |
| 8,954,929 | B2 | 2/2015 | Braude |
| 2009/0271770 | A1 | 10/2009 | Nir-Buchbinder et al. |
| 2012/0151455 | A1* | 6/2012 | Tsantilis ............... G06F 11/3688 717/132 |
| 2012/0158823 | A1* | 6/2012 | Ahuja ....................... G06F 9/54 709/203 |
| 2015/0220424 | A1* | 8/2015 | Yoshida .............. G06F 11/0745 714/38.1 |

(Continued)

FOREIGN PATENT DOCUMENTS

| | | |
|---|---|---|
| CN | 104375933 A | 2/2015 |
| CN | 102855177 B | 8/2015 |

(Continued)

OTHER PUBLICATIONS

Taneja, et al., "MODA: Automated Test Generation for Database Applications via Mock Objects", In Proceedings of the IEEE/ACM international conference on Automated software engineering, Sep. 20, 2010, 4 pages.

(Continued)

*Primary Examiner* — Chat C Do
*Assistant Examiner* — Lenin Paulino
(74) *Attorney, Agent, or Firm* — Wade IP Law PLLC

(57) ABSTRACT

Techniques are described herein that are capable of generating mock-based unit test(s) for an end-to-end test of a code snippet (a.k.a. system to test (STT)). For instance, method(s) in a code snippet that have a designated functionality are replaced with a wrapper function that has the designated functionality. Shims and/or stubs are inserted in the wrapper function to replace behavior of the method(s) with regard to callback method(s) from one or more dependencies of the method(s). Inputs that are included in the callback method(s) and that are intended for the code snippet are simulated to provide simulated inputs for the code snippet.

20 Claims, 6 Drawing Sheets

(56) References Cited

U.S. PATENT DOCUMENTS

| | | | |
|---|---|---|---|
| 2015/0242303 A1* | 8/2015 | Gautallin | G06F 11/3003 717/128 |
| 2015/0379169 A1* | 12/2015 | Wu | G06F 9/4552 703/26 |
| 2016/0147635 A1 | 5/2016 | Schwarzmann | |
| 2017/0003989 A1* | 1/2017 | Ben-Yair | H04L 67/025 |
| 2018/0032425 A1* | 2/2018 | Abadi | G06F 11/3696 |

FOREIGN PATENT DOCUMENTS

| | | |
|---|---|---|
| CN | 105468525 A | 4/2016 |
| IN | 01256CH2010 A | 6/2012 |

OTHER PUBLICATIONS

Alshahwan, et al., "AUTOMOCK: Automated Synthesis of a Mock Environment for Test Case Generation", In Proceedings of Practical Software Testing: Tool Automation and Human Factors, Mar. 14, 2010, pp. 1-4.

Saff, et al., "Mock Object Creation for Test Factoring", In Proceedings of the 5th ACM SIGPLAN-SIGSOFT workshop on Program analysis for software tools and engineering, Jun. 7, 2004, 3 pages.

Saff, et al., "Automatic test factoring for Java", In Proceedings of the 20th IEEE/ACM international Conference on Automated software engineering, Nov. 7, 2005, pp. 1-10.

Samimi, et al., "Declarative Mocking", In Proceedings of the International Symposium on Software Testing and Analysis, Jul. 15, 2013, pp. 246-256.

"Isolating Code under Test with Microsoft Fakes", Retrieved on: Sep. 6, 2016, 5 pages, Available at: https://msdn.microsoft.com/en-us/library/hh549175.aspx.

"WindowsIdentity Class", Retrieved on: Sep. 6, 2016, 10 pages, Available at: https://msdn.microsoft.com/en-us/library/system.security.principal.windowsidentity(v=vs.110).aspx.

* cited by examiner

MOCK-BASED UNIT TEST(S) FOR AN END-TO-END TEST OF A CODE SNIPPET

BACKGROUND

An end-to-end test of code (e.g., software code or firmware code) typically includes multiple unit tests. Each unit test may isolate a portion of the code from other portions of the code and test the functionality of the isolated portion. Unit tests may be automated. However, automated unit tests that involve dependencies, such as backend storage, web application programming interface (API) exposure, and/or third-party dependencies, often are characterized by productivity challenges. For example, when unit tests are massively created, execution of the tests often consumes a substantial amount of time and resources. In another example, data created in backend storage and changes made to the hosting environment during testing often cannot be cleaned up when the code and/or the test fails. Such a failure often increases the amount of time and resources that are consumed to execute the test. In yet another example, unit tests may be designed to have dependencies among themselves, which may require some tests to run before other tests in order to have necessary data prepared or changes made. Having dependencies among the unit tests may lead to the debugging of arbitrary tests being stopped without running all of the tests in a predefined sequence. In still another example, when unit tests are massively created, attempts to resolve the aforementioned productivity challenges or to rewrite the tests may consume substantial time and resources.

SUMMARY

Various approaches are described herein for, among other things, generating mock-based unit test(s) for an end-to-end test of a code snippet (a.k.a. system to test (STT)). A mock-based unit test is a unit test that utilizes one or more mocks. Examples of a mock include but are not limited to a fake, a shim, a stub, and a simulation. For instance, a mock-based unit test may use a mock in lieu of a behavior that is defined in a method of the code snippet or in lieu of an input for the code snippet that is received from a dependency. A dependency is an item on which a code snippet depends. Examples of an item include but are not limited to a database (e.g., a SQL database), a web service, an application service, an operating system, an application programming interface (API) or a group of APIs, and a network.

In an example approach, method(s) in a code snippet that have a designated functionality are replaced with a wrapper function that has the designated functionality. Shims and/or stubs are inserted in the wrapper function to replace behavior of the method(s) with regard to callback method(s) from one or more dependencies of the method(s). Inputs that are included in the callback method(s) and that are intended for the code snippet are simulated to provide simulated inputs for the code snippet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
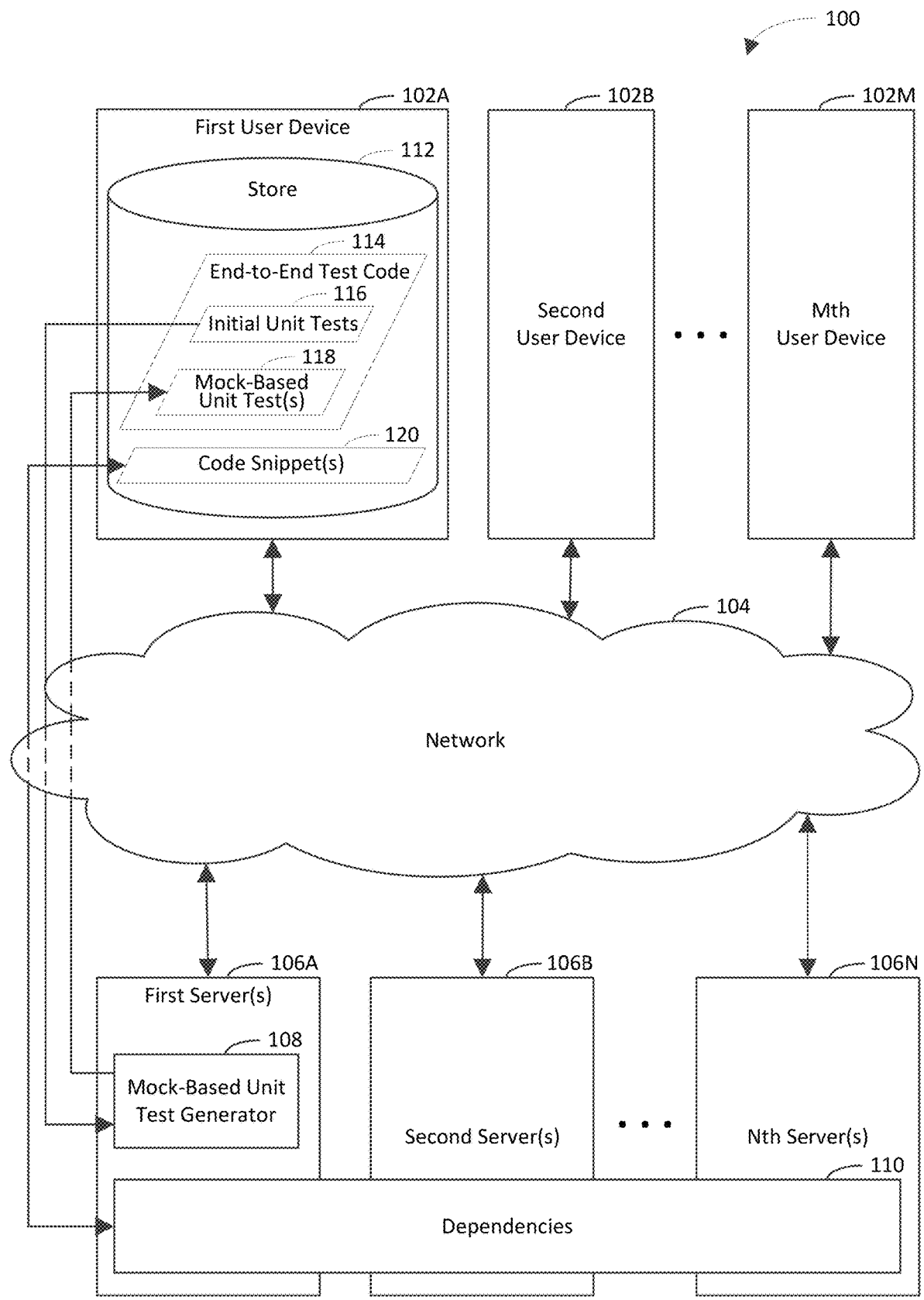
FIG. 1 is a block diagram of an example mock-based testing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of generating mock-based unit test(s) for an end-to-end test of a code snippet (a.k.a. system to test (STT)). A mock-based unit test is a unit test that utilizes one or more mocks. Examples of a mock include but are not limited to a fake, a shim, a stub, and a simulation. For instance, a mock-based unit test may use a mock in lieu of a behavior that is defined in a method of the code snippet or in lieu of an input for the code snippet that is received from a dependency. A dependency is an item on which a code snippet depends. Examples of an item include but are not limited to a database (e.g., a SQL database), a web service, an application service, an operating system, an application programming interface (API) or a group of APIs, and a network.

Example techniques described herein have a variety of benefits as compared to conventional techniques for performing an end-to-end test. For instance, the example techniques may be capable of reducing an amount of time and/or resources (e.g., processor, memory, network bandwidth) of a computing system that is consumed to execute one or more of the unit tests that are included in the end-to-end test. For example, configuring the unit test(s) as mock-based unit test(s) may enable the computing system to reduce the amount of time and/or resources that is consumed to execute the unit test(s). In accordance with this example, the execution time associated with interacting with dependencies in accordance with the example techniques described herein may be 10-100 times faster than conventional techniques. This benefit may be especially apparent for backend storage dependencies which traditionally consume a majority of the executing time. For instance, detouring the dependencies by providing return values and tracing input parameters in memory may contribute to the reduced execution time. Configuring the unit test(s) as mock-based unit test(s) may increase efficiency of the end-to-end test. Accordingly, the example techniques may increase efficiency of a computing system that is used to execute the unit test(s).

The example techniques may be capable of reducing the amount of data that is to be cleaned up when code or a test fails during the end-to-end test. The example techniques may be capable of reducing a number of changes to a hosting environment that are to be cleaned up when code or a test fails. For example, no data may be created, modified, or cleaned up with regard to dependencies when mocked function(s) are used. In accordance with this example, interaction with dependencies, which causes such data to be generated, may be eliminated. The example techniques may enable unit tests to run independently from other unit tests. Accordingly, the unit tests may be run in any suitable order without causing debugging of the tests to be stopped (e.g., due to missing data or unimplemented changes). For instance, by detouring calls that are directed to dependencies, each unit test may have its own copy of mocked data structures to simulate the dependencies such that running or debugging the unit tests individually does not affect other unit tests.

The example techniques may increase user efficiency (e.g., by reducing a number of steps that a user takes and/or an amount of effort that the user expends to perform and/or debug an end-to-end test). For instance, mocking functionality of methods in a code snippet and/or mocking inputs to the code snippet may enable a user to focus testing and debugging efforts on a single code snippet at a time, thereby reducing (e.g., eliminating) a need for the user to manually determine which code snippet is the source of an issue. Existing unit tests may not require changes. Mocked unit tests may be created automatically. Users may choose to run unit test wrappers with dependencies detoured for fast and massive combination verification or existing unit tests for end-to-end verification.

The example embodiments may isolate a code snippet and unit tests from dependencies of the code snippet. Accordingly, if any of the dependencies go down (e.g., become inoperable), the code snippet and the unit tests may be unaffected. For instance, the code snippet and the unit tests may be capable of operating even if the dependencies are down.

FIG. 1 is a block diagram of an example mock-based testing system 100 in accordance with an embodiment. Generally speaking, mock-based testing system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, mock-based testing system 100 generates mock-based unit test(s) for an end-to-end test of a code snippet. Detail regarding techniques for generating mock-based unit test(s) for an end-to-end test of a code snippet is provided in the following discussion.

As shown in FIG. 1, mock-based testing system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

First user device 102A is shown to include a store 112 for illustrative purposes. Store 112 stores end-to-end test code 114 and code snippet(s) 120. The end-to-end test code 114 is configured to test the code snippet(s) 120. For example, first user device 102A may execute the end-to-end code 114 or a portion thereof using processor(s) (not shown) to test the code snippet(s) 120. In accordance with this example, first user device 102A may execute the code snippet(s) 120 for purposes of testing. The end-to-end test code 114 includes initial unit tests 116 and mock-based unit test(s) 118. Each of the initial unit tests 116 is configured to test at least one of the code snippet(s) 120. Each of the mock-based unit test(s) 118 is based on (e.g., based at least in part on) a respective initial unit test. Some example techniques for generating the mock-based unit test(s) 118 from respective initial unit test(s) are discussed in further detail below.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, or the like. It will be recognized that any one or more user systems 102A-102M may communicate with any one or more servers 106A-106N.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of mock-based testing system 100.

One example type of computer program that may be executed by one or more of servers 106A-106N is a developer tool. A developer tool is a computer program that performs diagnostic operations (e.g., identifying source of problem, debugging, profiling, controlling, etc.) with respect to program code. Examples of a developer tool include but are not limited to a web development platform (e.g., Windows Azure Platform®, Amazon Web Services®, Google App Engine®, VMWare®, or Force.com®) and an integrated development environment (e.g., Microsoft Visual Studio®, JDeveloper®, NetBeans®, or Eclipse Platform™). It will be recognized that the example techniques described herein may be implemented using a developer tool, though the example embodiments are not limited in this respect. For instance, the example techniques may be implemented in a tool that is external to such a developer tool.

First server(s) 106A is shown to include mock-based unit test generator 108 for illustrative purposes. Mock-based unit test generator 108 is configured to generate the mock-based unit test(s) 118 from respective initial unit test(s) (i.e., one or more of the initial unit tests 116) of the end-to-end test code 114. Mock-based unit test generator 108 replaces method(s), which have a designated functionality, in a code snippet (e.g., in one of the code snippet(s) 120) with a wrapper function that has the designated functionality. Mock-based unit test generator 108 inserts shims and/or stubs in the wrapper function to replace behavior of the method(s) with regard to callback method(s) from one or more dependencies 110 of the code snippet(s) 120. Mock-based unit test generator 108 simulates inputs that are included in the callback method(s) and that are intended for the code snippet to provide simulated inputs for the code snippet.

The dependencies 110 of the code snippet(s) 120 are shown to be distributed across servers 106A-106N for illustrative purposes and are not intended to be limiting. It will be recognized that the dependencies 110 may be included in any one or more of the servers 106A-106N.

It will be further recognized that mock-based unit test generator 108 may be (or may be included in) a developer tool, though the scope of the example embodiments is not limited in this respect. Example techniques for generating mock-based unit test(s) for an end-to-end test of a code snippet are discussed in greater detail below with reference to FIGS. 2-5.

Mock-based unit test generator 108 may be implemented in various ways to selectively generate mock-based unit test(s) for an end-to-end test of a code snippet, including being implemented in hardware, software, firmware, or any combination thereof. For example, mock-based unit test generator 108 may be implemented as computer program code configured to be executed in one or more processors. In another example, mock-based unit test generator 108 may be implemented as hardware logic/electrical circuitry. For instance, mock-based unit test generator 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Mock-based unit test generator 108 is shown to be incorporated in first server(s) 106A for illustrative purposes and is not intended to be limiting. It will be recognized that mock-based unit test generator 108 (or any portion(s) thereof) may be incorporated in any one or more of the user systems 102A-102M. For example, client-side aspects of mock-based unit test generator 108 may be incorporated in one or more of the user systems 102A-102M, and server-side aspects of mock-based unit test generator 108 may be incorporated in first server(s) 106A. In another example, mock-based unit test generator 108 may be distributed among the user systems 102A-102M. In yet another example, mock-based unit test generator 108 may be incorporated in a single one of the user systems 102A-102M. In another example, mock-based unit test generator 108 may be distributed among the server(s) 106A-106N. In still another example, mock-based unit test generator 108 may be incorporated in a single one of the server(s) 106A-106N.

Figure 2:
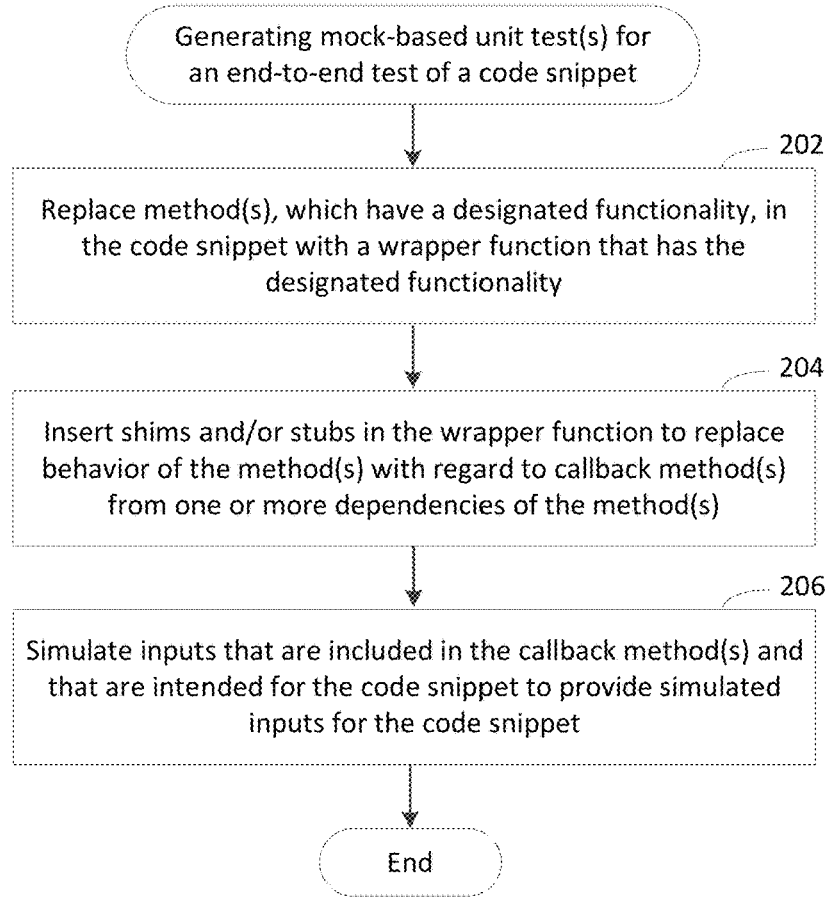
FIG. 2 depicts a flowchart of an example method for generating mock based unit test(s) for an end-to-end test of a code snippet in accordance with an embodiment.
Figure 3:
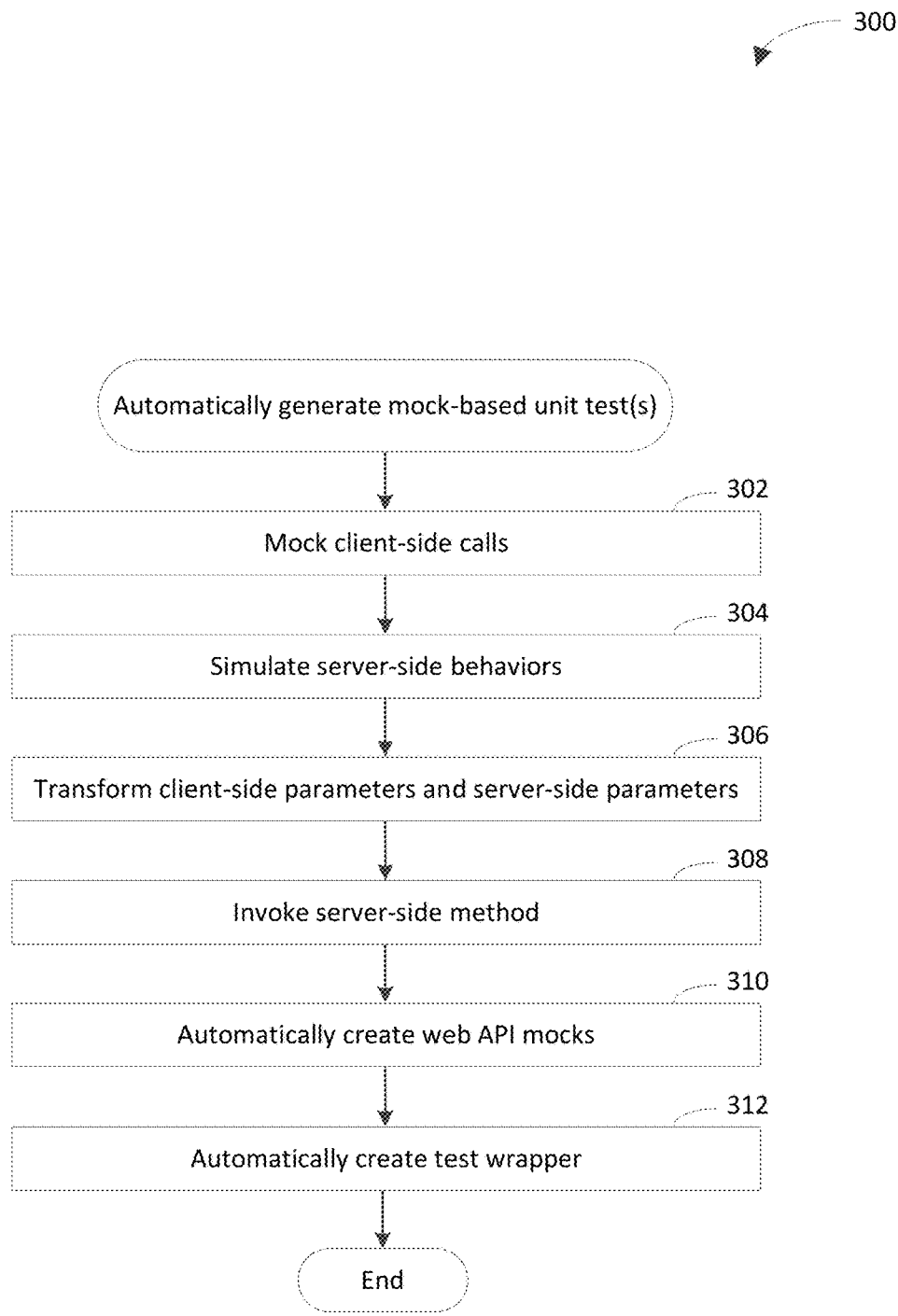
FIGS. 3-4 depict flowcharts of example methods for automatically generating mock based unit test(s) in accordance with embodiments.
Figure 4:
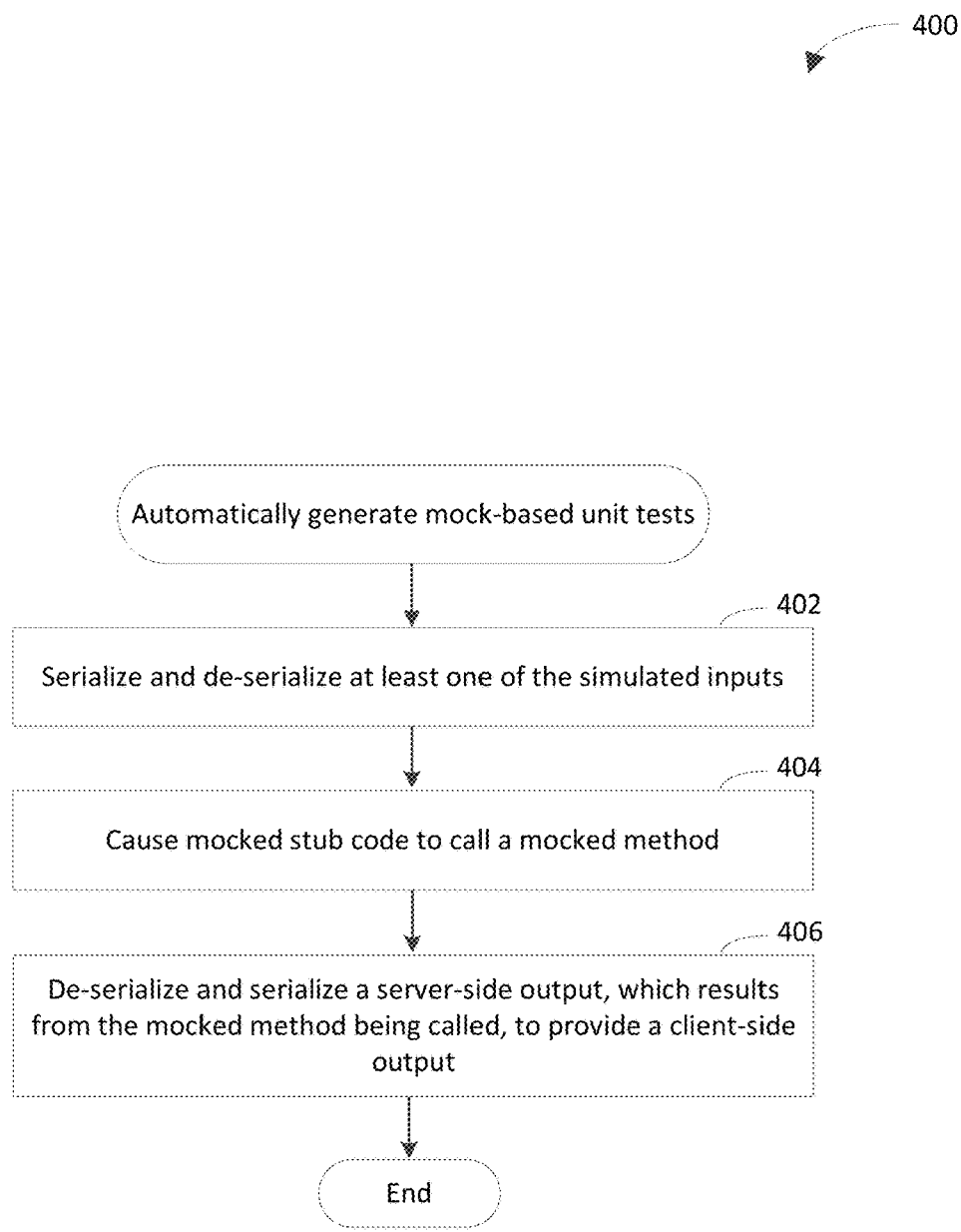
Figure 5:
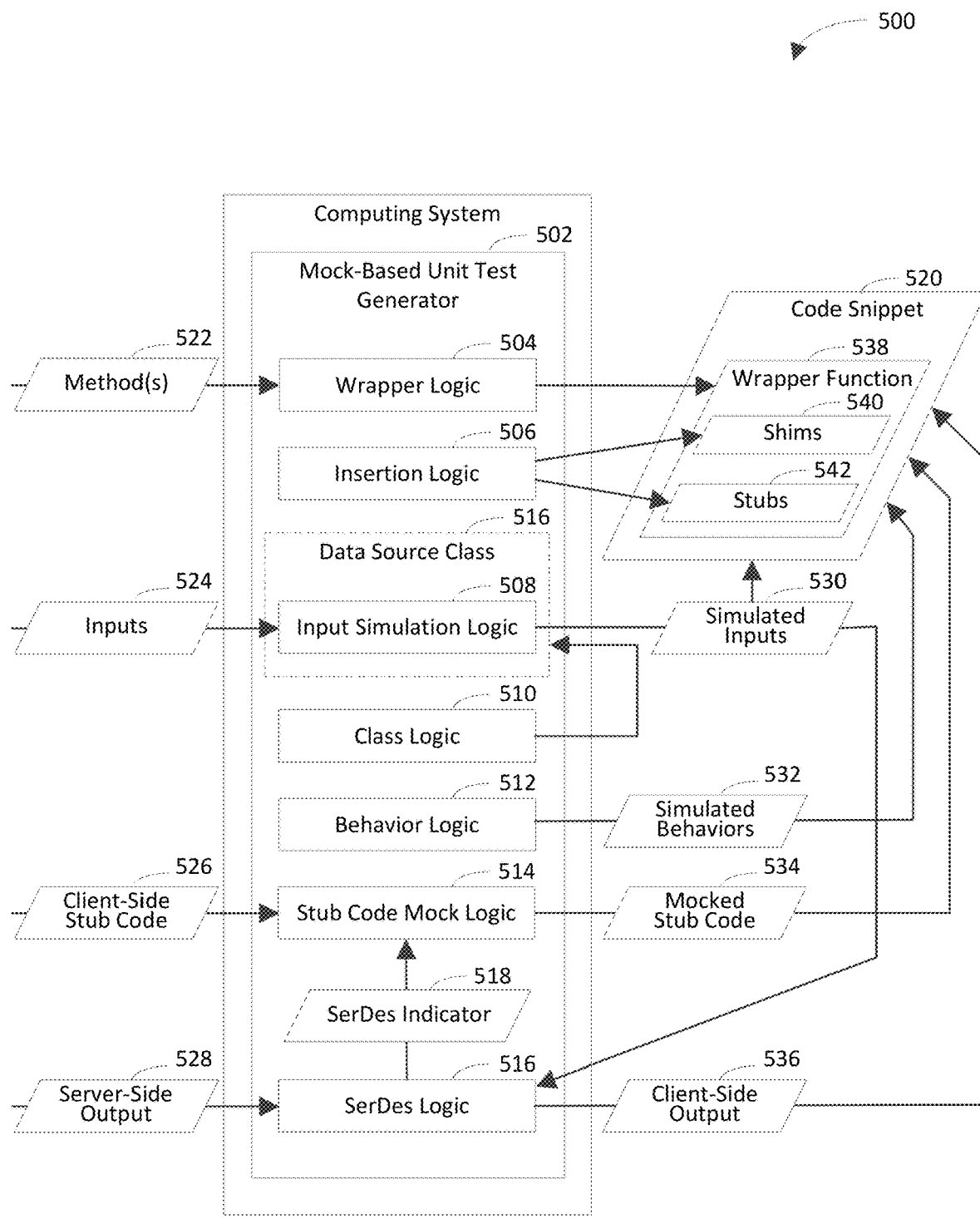
FIG. 5 is a block diagram of an example computing system in accordance with an embodiment.

FIG. 2 depicts a flowchart 200 of an example method for generating mock based unit test(s) for an end-to-end test of a code snippet in accordance with an embodiment. FIGS. 3-4 depict flowcharts 300 and 400 of example methods for automatically generating mock based unit test(s) in accordance with embodiments. Flowcharts 200, 300, and 400 may be performed by mock-based unit test generator 108 shown in FIG. 1, for example. For illustrative purposes, flowcharts 200, 300, and 400 are described with respect to a computing system 500 shown in FIG. 5. Computing system 500 may include one or more of user systems 102A-102M, one or more of server(s) 106A-106N, or any combination thereof, though the scope of the example embodiments is not limited in this respect. Computing system 500 includes mock-based unit test generator 502. Mock-based unit test generator 502 includes wrapper logic 504, insertion logic 506, input simulation logic 508, class logic 510, behavior logic 512, stub code mock logic 514, and SerDes logic 516. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, method(s), which have a designated functionality, in the code snippet are replaced with a wrapper function that has the designated functionality. The method(s) may include a single method or multiple methods. In an example implementation, wrapper logic 504 replaces method(s) 522, which have the designated functionality, in a code snippet 520 with a wrapper function 538 that has the designated functionality.

At step 204, shims and/or stubs are inserted in the wrapper function to replace behavior of the method(s) with regard to callback method(s) from one or more dependencies of the method(s). For instance, the shims and/or stubs may be inserted in the wrapper function to replace behavior that is exhibited by the method(s) in response to the callback method(s) that are received from one or more of the dependencies. In an example implementation, insertion logic 506 inserts shims 540 and/or stubs 542 in the wrapper function 538 to replace behavior of the method(s) 522 with regard to callback method(s) from one or more dependencies (e.g., dependencies 110) of the method(s) 522.

In an example embodiment, inserting the shims and/or the stubs at step 204 includes loading and enumerating a shimmed type, which is associated with a web API class type, for each of the method(s). In accordance with this embodiment, each shimmed type includes properties that specify the respective method and that further specify a respective callback method.

In another example embodiment, the callback method(s) include at least one callback method from a web service (e.g., a web API host), at least one callback method from a database (e.g., a structured query language (SQL) database), at least one callback method from an application service, and/or at least one callback method from an operating system.

At step 206, inputs that are included in the callback method(s) and that are intended for the code snippet are simulated to provide simulated inputs for the code snippet. For example, the callback method(s) may be modified to replace the inputs with the simulated inputs. In another example, the inputs may be simulated during execution of the code snippet. In an example implementation, input simulation logic 508 simulates inputs 524 that are included in the callback method(s) and that are intended for the code snippet 520 to provide simulated inputs 530 for the code snippet 520. For example, input simulation logic 508 may provide one or more (e.g., all) of the simulated inputs 530 directly to the code snippet 520 for processing by the code snippet 520. In another example, input simulation logic 508 may provide one or more of the simulated inputs 508 to SerDes logic 516 for processing (e.g., serialization and/or de-serialization) before those simulated input(s) are provided to the code snippet 520.

In an example fakes embodiment, fakes logic (e.g., Microsoft Fakes®) intercepts a runtime (e.g., .NET common language runtime (CLR)) in an intermediate language (IL) interpretation layer so that when a function (e.g., constructor, method, or property of a class) is called, the execution flow of a code snippet is detoured to a specified callback method passed prior to the function being called. It is expected that a user (e.g., a software engineer) chooses proper method(s) to intercept and that the user implements the callback properly to make the code snippet perform as if it were not intercepted. To decouple the dependencies during execution of the end-to-end test, the following example approaches may be applied.

Backend Storage

With reference to step 202, a database example will be discussed for non-limiting illustrative purposes. In accordance with this example, the code snippet is modified to have specific methods refactored by wrapper functions, which may share the same logic as the original code snippet. The wrapper functions may deal with only data exchange between the code snippet and the database (e.g., connection opening and/or closing, stored procedure and SQL statement execution, and result data retrieval and enumeration). It is noted that the .NET library that interacts with the SQL data engine (e.g., System.Data.SqlClient) is not mocked in this embodiment.

With reference to step 204, the wrapper functions may be mocked with the fakes logic, which replaces the behavior of the original methods to the callbacks passed in. Some methods may not be able to mock due to a functionality limitation. An alternative to mocking is to refactor the code snippet by moving the logic to a helper class that does not have the limitation.

With reference to step 206, in the callback methods, the input parameters may be traced; the output parameters may be prepared; and the inputs from the dependencies that are intended for the code snippet may be simulated.

Web API Host

With reference to step 202, a web service host example will be discussed for no-limiting illustrative purposes. One example of a web service host is an Internet information service (IIS). In accordance with the web service host example, classes (e.g., OperationContext and HttpContext under name space System.ServiceModel) may be invoked to fetch contextual information inside the web APIs exposed (e.g., Windows Communication Foundation (WCF) web service APIs). For instance, the contextual information may include the API client caller's primary identifier and/or the operation of the API call. The code snippet need not necessarily be modified as described above with reference to the backend storage approach, though the wrapper function refactoring may be used if necessary.

The fakes logic may be capable of mocking the following methods:
OperationContext.Current,
OperationContext.ctor(lContextChannel),
OperationContext.IncomingMessageHeaders,
OperationContext.IncomingMessageProperties,
OperationContext.ServiceSecurityContext,
OperationContext.InstanceContext,
HttpContext.Current,
HttpContext.ctor(HttpRequest,HttpResponse),
HttpContext.User,
HttpContext.Request,
HttpRequest.ctor,
HttpRequest.Headers,
ServiceSecurityContext.PrimaryIdentity, and
InstanceContext.GetServiceInstance.

The fakes logic may not be capable of mocking the following methods, and refactoring of the code snippet by the wrapper functions may be needed:
OperationContext.IncomingMessageHeaders.FindHeader,
OperationContext.IncomingMessageHeaders.GetHeader,
OperationContext.IncomingMessageHeaders.Action,
OperationContext.EndpointDispatcher.Channel
Dispatcher.BindingName, and
OperationContext.Host.Description.ServiceType.

With reference to step 204, the classes mentioned above with regard to step 202 may be mocked in (static) constructors. The fakes logic may mock the wrapper functions as described above with reference to the backend storage approach for singleton property and property access (e.g., OperationContext.Current.IncomingMessageHeaders to fetch message headers of a WCF web service call).

With reference to step 206, in the callback methods, the input parameters may be traced; the output parameters may be prepared; and the inputs from the dependencies that are intended for the code snippet may be simulated, as described above with reference to the backend storage approach.

Other System Dependencies

The description above regarding the backend storage approach is applicable to other system dependencies.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes defining a data source class to encapsulate input simulation logic, which simulates the inputs that are included in the callback method(s) and that are intended for the code snippet. In accordance with this embodiment, the data source class is configured to isolate the input simulation logic from insertion logic, which inserts the shims and/or the stubs in the wrapper function. By encapsulating the input simulation logic, the data source class may inhibit (e.g., prevent) the input simulation logic from accessing the insertion logic, inputs that are provided to the insertion logic, and/or outputs that are generated by the insertion logic. By encapsulating the input simulation logic, the data source class may inhibit the insertion logic from accessing the input simulation logic, inputs that are provided to the input simulation logic, and/or outputs that are generated by the input simulation logic. In an example implementation, class logic 510 defines a data source class 516 to encapsulate input simulation logic 508, which simulates the inputs 524 that are included in the callback method(s) and that are intended for the code snippet 520. In accordance with this implementation, the data source class 516 is configured to isolate input simulation logic 508 from insertion logic 506, which inserts the shims 540 and/or the stubs 542 in the wrapper function 538.

In another example embodiment, the method of flowchart 200 further includes simulating behaviors of the one or more dependencies of the method(s). For instance, the behaviors of the one or more dependencies may be simulated during execution of the code snippet. In an example implementation, behavior logic 512 simulates the behaviors of the one or more dependencies of the method(s) 522 to provide simulated behaviors 532. In accordance with this embodiment, the one or more dependencies are external to the code snippet and end-to-end test code that is configured to perform the end-to-end test. In an example implementation, the one or more dependencies are external to the code snippet 520 and the end-to-end test code.

In an aspect of this embodiment, simulating the behaviors of the one or more dependencies includes providing set(s) of data structures (e.g., set(s) of in-memory data structures) for the respective mock-based unit test(s). In accordance with this aspect, each set of data structures is configured to simulate the behaviors of the one or more dependencies. In an example of this aspect, the mock-based unit test(s) include multiple mock-based unit tests. In accordance with this example, providing the set(s) of data structures includes providing multiple sets of data structures for the respective mock-based unit tests such that the mock-based unit tests do not depend on each other and/or do not impact each other (e.g., because the in-memory data structures may have individual copies per unit test). This may be helpful for test scenarios that verify the code snippet for specific inputs from dependencies (e.g., different returning values from stored procedures, SQL statement calls, and/or web API calls).

It should be noted that initial unit tests (e.g., initial unit tests 116) may invoke client-side stub code, hypertext transfer protocol (HTTP) request calls, and/or HTTP secure (HTTPS) request calls, rather than web API server-side code. Whereas, mocking may take effect only on server-side code. It may be relatively expensive to update the initial unit tests to adapt for mocking purposes, especially considering that the same initial unit tests also serve end-to-end testing purposes. One possible solution is for the initial unit tests to remain unchanged, while each of the initial unit tests may have a corresponding mock-based unit test that is created automatically with mocked functions. The mock-based unit tests may have client-side calls replaced by server-side calls with mocking implemented. The mock-based unit tests may eventually call the server-side code directly with the same server-side behaviors and extensions.

Thus, in yet another example embodiment, the method of flowchart 200 further includes automatically generating the mock-based unit test(s) to exist concurrently with respective initial unit test(s) on which the respective mock-based unit test(s) are based. For instance, mock-based unit test generator 502, including any one or more of the logic 504, 506, 508, 510, 512, 514, and/or 516 included therein, may automatically generate the mock-based unit test(s) (e.g., mock-based unit test(s) 118) to exist concurrently with the respective initial unit test(s) (e.g., one or more of the initial unit tests 116) on which the respective mock-based unit test(s) are based. In accordance with this embodiment, the mock-based unit test(s) are configured to utilize the wrapper function in lieu of the behavior of the method(s) and to further utilize the simulated inputs in lieu of the inputs. For example, wrapper logic 504 may configure the mock-based unit test(s) to utilize the wrapper function 538 in lieu of the behavior of the method(s) 522. In accordance with this example, input simulation logic 508 may configure the mock-based unit test(s) to utilize the simulated inputs 530 in lieu of the inputs 524. In further accordance with this embodiment, the initial unit test(s) are configured to utilize the behavior of the method(s) rather than the wrapper function and to further utilize the inputs rather than the simulated inputs. In further accordance with this embodiment, the mock-based unit test(s) and the initial unit test(s) are configured to call server-side code. For instance, the initial unit test(s) may be configured to utilize the behavior of the method(s) 522 rather than the wrapper function 538 and to further utilize the inputs 524 rather than the simulated inputs 530. In further accordance with this embodiment, the mock-based unit test(s) and the initial unit test(s) are configured to call server-side code.

In an aspect of the aforementioned embodiment, automatically generating the mock-based unit test(s) includes mocking client-side stub code associated with at least one dependency to provide mocked stub code that is configured to call a mocked method, which simulates functionality of server-side methods, in lieu of the server-side methods. For instance, the dependency may be a web service. Examples of a web service include but are not limited to a Windows Communication Foundation (WCF) web service and a representational state transfer (REST) web service. In an example implementation, stub code mock logic 514 mocks client-side stub code 526, which is associated with at least one dependency, to provide mocked stub code 534 that is configured to call the mocked method.

In another aspect of the aforementioned embodiment, automatically generating the mock-based unit test(s) includes one or more of the steps shown in flowchart 300 of FIG. 3. As shown in FIG. 3, the method of flowchart 300 begins at step 302. In step 302, client-side calls are mocked. In an example implementation, stub code mock logic 514 mocks the client-side calls. For instance, stub code mock logic 514 may generate mocked stub code 534 to mock the client-side calls. In a first example, at least one client-side call is associated with a WCF web service. In accordance with this example, the SoapHttpClientProtocol.ctor method and the SoapHttpClientProtocol.Invoke method are mocked to provide mocked methods. In further accordance with this example, client-side stub code associated with the WCF web service detours to the mocked methods. In a second example, at least one client-side call is associated with a REST web API. In accordance with this example, the code snippet may be refactored to detour client API calls (e.g., all client API calls) into a single mocked method. For both of these examples, the type of the server-side class may be specified by configuration. For instance, it may not be possible to determine the type of the server-side class by the client-side stub code alone.

At step 304, sever-side behaviors are simulated. In an example implementation, behavior logic 512 simulates the server-side behaviors. For instance, behavior logic 512 may generate simulated behaviors 532 to simulate the server-side behaviors. In an example, at least one of the dependencies of the code snippet is a WCF web service. For the WCF web service, a method may have attribute(s), which may invoke a specified method (e.g., IParameterInspector.BeforeCall). Reflection (e.g., .NET reflection) may be used to retrieve type information regarding the attribute(s), to instantiate the type, and to invoke the method (e.g., as if the web service host model did in the mocked function). Service extensions may be configured in an application configuration file. The type information may be retrieved to instantiate the type and invoke the method (as if the web service host model did in the mocked function).

At step 306, client-side parameters and server-side parameters are transformed. In an example implementation, SerDes logic 516 transforms the client-side parameters and the server-side parameters. Some example functionality of SerDes logic 516 is discussed in further detail with regard to FIG. 4 below. In an example, at least one of the dependencies of the code snippet is a WCF web service. For the WCF web service, client-side input parameters may be serialized by an XML serializer, and server side input parameters may be de-serialized by a data contract de-serializer. Output parameters may be processed in reversed order. An "xmlns" namespace may be set for the transformation from client to server, and the namespace may be removed in the transformation from server to client. During simulation of server-side behaviors and extensions, client-side input parameters may be passed through a serialization process and a de-serialization process before the server-side method is called. Server-side output parameters may be passed through a de-serialization process and a serialization process after the server-side method is called.

At step 308, a server-side method is invoked. In an example implementation, SerDes logic 516 invokes the server-side method. In an example, a server-side object is instantiated, and the method is called with transformed parameters. In accordance with this example, if the method returns a server-side value, the server-side value is transformed to a client-side parameter (e.g., through de-serialization and serialization).

At step 310, web API mocks are automatically created. It will be recognized that a web API mock is a mock of a web API. In an example implementation, insertion logic 506 automatically creates the web API mocks. For example, insertion logic 506 may automatically generate the shims 540 and/or the stubs 542 to automatically create the web API mocks. In accordance with this example, the shims 540 and/or the stubs 542 may include the web API mocks. In an example, reflection (e.g., .NET reflection) may be used to load and enumerate a shimmed type (e.g., a Microsoft Fakes™ shimmed type) of a web API class type for each method that the shimmed type is to mock. Each shimmed type may include a property to specify the callback associated with each method that is to be mocked. Each of the properties includes attribute(s), including an attribute that specifies each method that the corresponding shimmed type is to mock. The parameter information may be retrieved for the method to construct the code snippet (e.g., to set the passing and returning parameters for the mocked function). For instance, the code snippet may include the following: ShimNameSpace.ShimClassName.MockMethod=(parameter list in lambda expression)=>var inputs=new object[ ] {parameter object list}; return (return type)CommonEntry (server side object, method name, inputs);}.

In accordance with this example, a predefined method (e.g., CommonEntry) dispatches mock method(s) per the method name(s) passed. The predefined method may be configured in any of a variety of ways. In one aspect, all mocked methods may do nothing but return a trivial result. In another aspect, methods that are called may be implemented, and methods that are not called may not be implemented. In yet another aspect, some of the methods may be called, and calls to other methods may be detoured to the corresponding mocked functions. It will be recognized that code snippets may save the manual coding work, which may be added into projects that include appropriate references.

At step 312, a test wrapper is automatically created. In an example implementation, wrapper logic 504 automatically creates the test wrapper. For example, the wrapper function 538 may be the test wrapper. Accordingly, wrapper logic 504 may automatically create the test wrapper by automatically generating the wrapper function 538. In an example, reflection (e.g., .NET reflection) may be used to load the unit test library to locate a test class that includes TestClassAttribute. Each of the methods in the class may be checked for the following attributes: TestMethodAttribute, TestInitializeAttribute, TestCleanupAttribute, ClassInitializeAttribute, ClassCleanupAttribute, AssemblyInitializeAttribute, and AssemblyCleanupAttribute. In accordance with this example, the code snippet is configured to wrap the method that is to be mocked for each of the attributes. For the TestMethodAttribute attribute, the shim context setup and scoping code are added, passing the call to the method that is to be mocked. The method that is created is a test method available for unit testing. For other attributes, the call is passed to the original method, and the unit test has its original initialization and cleanup behavior. Code snippets may save the manual coding work, which may be added into projects that include appropriate references. When running and/or debugging the unit tests, the mocks (e.g., shims and/or stubs) take effect, and the web API client call is detoured to the server-side code (e.g., without interacting with the real web service instance over HTTP or HTTPS). The service server-side code is called and further mocked if necessary. The dependencies (e.g., backend storage or a web API host) are mocked as described in the preceding discussion. Existing unit tests need not necessarily be changed and run as if they were calling the web API with real dependencies. When the initial unit tests are run and/or debugged, the initial unit tests are not changed. Thus, the techniques described herein may be transparent for an existing testing experience.

In an example embodiment, the method of flowchart 300 includes one or more of the steps shown in flowchart 400 of FIG. 4. For instance, steps 306 and 308 of FIG. 3 may be implemented using one or more of the steps shown in flowchart 400. As shown in FIG. 4, the method of flowchart 400 begins at step 402. In step 402, at least one of the simulated inputs is serialized and de-serialized. In an example implementation, SerDes logic 516 serializes and de-serializes at least one of the simulated inputs 530. SerDes logic 516 may generate a SerDes indicator 518 in response to serializing and de-serializing at least one of the simulated inputs 530. The SerDes indicator 518 may specify that at least one of the simulated inputs 530 is serialized and de-serialized.

At step 404, mocked stub code is caused to call a mocked method. In an example implementation, stub code mock logic 514 causes the mocked stub code 534 to call the mocked method. For example, stub code mock logic 514 may cause the mocked stub code 534 to call the mocked method in response to receipt of the SerDes indicator 518 (e.g., based at least in part on the SerDes indicator 518 specifying that at least one of the simulated inputs 530 is serialized and de-serialized).

At step 406, a server-side output, which results from the mocked method being called, is de-serialized and serialized to provide a client-side output. In an example implementation, SerDes logic 516 may de-serialize and serialize a server-side output 528, which results from the mocked method being called, to provide a client-side output 536.

It will be recognized that computing system 500 may not include one or more of mock-based unit test generator 502, wrapper logic 504, insertion logic 506, input simulation logic 508, class logic 510, behavior logic 512, stub code mock logic 514, and/or SerDes logic 516. Furthermore, computing system 500 may include components in addition to or in lieu of mock-based unit test generator 502, wrapper logic 504, insertion logic 506, input simulation logic 508, class logic 510, behavior logic 512, stub code mock logic 514, and/or SerDes logic 516.

Any one or more of user systems 102A-102M, any one or more of servers 106A-106N, mock-based unit test generator 108, mock-based unit test generator 502, wrapper logic 504, insertion logic 506, input simulation logic 508, class logic 510, behavior logic 512, stub code mock logic 514, SerDes logic 516, flowchart 200, flowchart 300, and/or flowchart 400 may be implemented in hardware, software, firmware, or any combination thereof.

For example, any one or more of user systems 102A-102M, any one or more of servers 106A-106N, mock-based unit test generator 108, mock-based unit test generator 502, wrapper logic 504, insertion logic 506, input simulation logic 508, class logic 510, behavior logic 512, stub code mock logic 514, SerDes logic 516, flowchart 200, flowchart 300, and/or flowchart 400 may be implemented, at least in part, as computer program code configured to be executed in one or more processors.

In another example, any one or more of user systems 102A-102M, any one or more of servers 106A-106N, mock-based unit test generator 108, mock-based unit test generator 502, wrapper logic 504, insertion logic 506, input simulation logic 508, class logic 510, behavior logic 512, stub code mock logic 514, SerDes logic 516, flowchart 200, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In an example method of generating one or more mock-based unit tests for an end-to-end test of a code snippet, one or more methods, which have a designated functionality, in the code snippet are replaced with a wrapper function that has the designated functionality. At least one of shims or stubs are inserted in the wrapper function to replace behavior of the one or more methods with regard to one or more callback methods from one or more dependencies of the one or more methods. Inputs that are included in the one or more callback methods and that are intended for the code snippet are simulated to provide simulated inputs for the code snippet.

In a first aspect of the example method, the example method comprises defining a data source class to encapsulate input simulation logic, which simulates the inputs that are included in the one or more callback methods and that are intended for the code snippet, the data source class configured to isolate the input simulation logic from insertion logic, which inserts the at least one of the shims or the stubs in the wrapper function.

In a second aspect of the example method, the example method further comprises simulating behaviors of the one or more dependencies of the one or more methods, the one or more dependencies being external to the code snippet and end-to-end test code that is configured to perform the end-to-end test. The second aspect of the example method may be implemented in combination with the first aspect of the example method, though the example embodiments are not limited in this respect.

In an example of the second aspect of the example method, simulating the behaviors of the one or more dependencies comprises providing one or more sets of data structures for the one or more respective mock-based unit tests. Each set of data structures is configured to simulate the behaviors of the one or more dependencies.

In a third aspect of the example method, the example method further comprises automatically generating the one or more mock-based unit tests to exist concurrently with one or more respective initial unit tests on which the one or more respective mock-based unit tests are based. In accordance with the third aspect, the one or more mock-based unit tests are configured to utilize (a) the wrapper function in lieu of the behavior of the one or more methods and (b) the simulated inputs in lieu of the inputs. In further accordance with the third aspect, the one or more initial unit tests are configured to utilize (a) the behavior of the one or more methods rather than the wrapper function and (b) the inputs rather than the simulated inputs. In further accordance with the third aspect, the one or more mock-based unit tests and the one or more initial unit tests are configured to call server-side code. The third aspect of the example method may be implemented in combination with the first and/or second aspect of the example method, though the example embodiments are not limited in this respect.

In an example of the third aspect of the example method, automatically generating the one or more mock-based unit tests comprises mocking client-side stub code associated with at least one dependency that is included in the one or more dependencies to provide mocked stub code that is configured to call a mocked method, which simulates functionality of server-side methods, in lieu of the server-side methods.

In an implementation of this example, automatically generating the one or more mock-based unit tests comprises serializing and de-serializing at least one simulated input that is included in the simulated inputs. In accordance with this implementation, automatically generating the one or more mock-based unit tests further comprises causing the mocked stub code to call the mocked method in response to serializing and de-serializing the at least one simulated input. In further accordance with this implementation, automatically generating the one or more mock-based unit tests further comprises de-serializing and serializing a server-side output, which results from the mocked method being called, to provide a client-side output.

In a fourth aspect of the example method, inserting the at least one of the shims or the stubs comprises loading and enumerating a shimmed type, which is associated with a web API class type, for each of the one or more methods. In accordance with the fourth aspect, each shimmed type includes properties that specify the respective method that is included in the one or more methods and a respective callback method that is included in the one or more callback methods. The fourth aspect of the example method may be implemented in combination with the first, second, and/or third aspect of the example method, though the example embodiments are not limited in this respect.

In a fifth aspect of the example method, inserting the at least one of the shims or the stubs comprises inserting the at least one of the shims or the stubs in the wrapper function to replace the behavior of the one or more methods with regard to the one or more callback methods that include at least one callback method from a web service. The fifth aspect of the example method may be implemented in combination with the first, second, third, and/or fourth aspect of the example method, though the example embodiments are not limited in this respect.

In a sixth aspect of the example method, inserting the at least one of the shims or the stubs comprises inserting the at least one of the shims or the stubs in the wrapper function to replace the behavior of the one or more methods with regard to the one or more callback methods that include at least one callback method from a database. The sixth aspect of the example method may be implemented in combination with the first, second, third, fourth, and/or fifth aspect of the example method, though the example embodiments are not limited in this respect.

An example system to generate one or more mock-based unit tests for an end-to-end test of a code snippet comprises a mock-based unit test generator configured to generate the one or more mock-based unit tests from one or more respective initial unit tests. The mock-based unit test generator comprises wrapper logic configured to replace one or more methods, which have a designated functionality, in the code snippet with a wrapper function that has the designated functionality. The mock-based unit test generator further comprises insertion logic configured to insert at least one of shims or stubs in the wrapper function to replace behavior of the one or more methods with regard to one or more callback methods from one or more dependencies of the one or more methods. The mock-based unit test generator further comprises input simulation logic configured to simulate inputs that are included in the one or more callback methods and that are intended for the code snippet to provide simulated inputs for the code snippet.

In a first aspect of the example system, the mock-based unit test generator further comprises class logic configured to define a data source class to encapsulate input simulation logic, which simulates the inputs that are included in the one or more callback methods and that are intended for the code snippet. In accordance with the first aspect, the data source class is configured to isolate the input simulation logic from the insertion logic, which inserts the at least one of the shims or the stubs in the wrapper function.

In a second aspect of the example system, the mock-based unit test generator further comprises behavior logic configured to simulate behaviors of the one or more dependencies of the one or more methods. In accordance with the second aspect, the one or more dependencies are external to the code snippet and end-to-end test code that is configured to perform the end-to-end test. The second aspect of the example system may be implemented in combination with the first aspect of the example system, though the example embodiments are not limited in this respect.

In an example of the second aspect of the example system, the behavior logic is configured to provide one or more sets of data structures for the one or more respective mock-based unit tests, each set of data structures configured to simulate the behaviors of the one or more dependencies.

In a third aspect of the example system, the mock-based unit test generator is configured to automatically generate the one or more mock-based unit tests to exist concurrently with one or more respective initial unit tests on which the one or more respective mock-based unit tests are based. In accordance with the third aspect, the one or more mock-based unit tests are configured to utilize (a) the wrapper function in lieu of the behavior of the one or more methods and (b) the simulated inputs in lieu of the inputs. In further accordance with the third aspect, the one or more initial unit tests are configured to utilize (a) the behavior of the one or more methods rather than the wrapper function and (b) the inputs rather than the simulated inputs. In further accordance with the third aspect, the one or more mock-based unit tests and the one or more initial unit tests are configured to call server-side code. The third aspect of the example system may be implemented in combination with the first and/or second aspect of the example system, though the example embodiments are not limited in this respect.

In an example of the third aspect of the example system, the mock-based unit test generator further comprises stub code mock logic configured to mock client-side stub code associated with at least one dependency that is included in the one or more dependencies to provide mocked stub code that is configured to call a mocked method, which simulates functionality of server-side methods, in lieu of the server-side methods.

In an implementation of this example, the mock-based unit test generator further comprises serdes logic configured to serialize and de-serialize at least one simulated input that is included in the simulated inputs. In accordance with this implementation, the stub code logic is further configured to cause the mocked stub code to call the mocked method in response to serialization and de-serialization of the at least one simulated input. In further accordance with this implementation, the serdes logic is further configured to de-serialize and serialize a server-side output, which results from the mocked method being called, to provide a client-side output.

In a fourth aspect of the example system, the insertion logic is configured to load and enumerate a shimmed type, which is associated with a web API class type, for each of the one or more methods. In accordance with the fourth aspect, each shimmed type includes properties that specify the respective method that is included in the one or more methods and a respective callback method that is included in the one or more callback methods. The fourth aspect of the example system may be implemented in combination with the first, second, and/or third aspect of the example system, though the example embodiments are not limited in this respect.

In a fifth aspect of the example system, the one or more callback methods include at least one callback method from a web service. The fifth aspect of the example system may be implemented in combination with the first, second, third, and/or fourth aspect of the example system, though the example embodiments are not limited in this respect.

In a sixth aspect of the example system, the one or more callback methods include at least one callback method from a database. The sixth aspect of the example system may be implemented in combination with the first, second, third, fourth, and/or fifth aspect of the example system, though the example embodiments are not limited in this respect.

An example computer program product comprises a computer-readable storage medium having instructions recorded thereon for enabling a processor-based system to generate one or more mock-based unit tests from one or more respective initial unit tests of an end-to-end test of a code snippet. The instructions comprise first instructions for enabling the processor-based system to replace one or more methods, which have a designated functionality, in the code snippet with a wrapper function that has the designated functionality. The instructions further comprise second instructions for enabling the processor-based system to insert at least one of shims or stubs in the wrapper function to replace behavior of the one or more methods with regard to one or more callback methods from one or more dependencies of the one or more methods. The instructions further comprise third instructions for enabling the processor-based system to simulate inputs that are included in the one or more callback methods and that are intended for the code snippet to provide simulated inputs for the code snippet.

IV. Example Computer System

Figure 6:
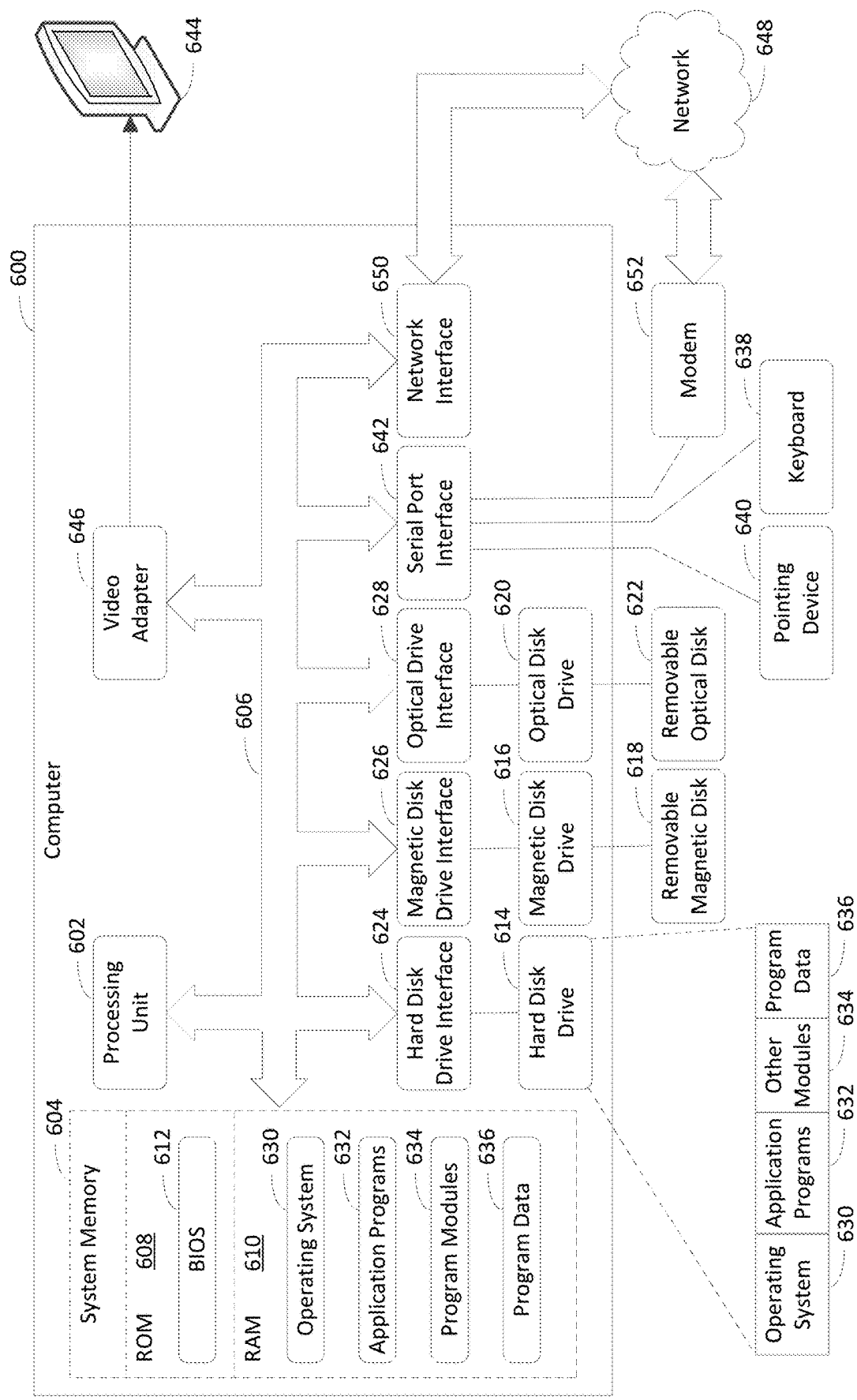
FIG. 6 depicts an example computer in which embodiments may be implemented.

FIG. 6 depicts an example computer 600 in which embodiments may be implemented. Any one or more of any one or more of user systems 102A-102M and/or any one or more of servers 106A-106N shown in FIG. 1 and/or computing system 500 shown in FIG. 5 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of mock-based unit test generator 108, mock-based unit test generator 502, wrapper logic 504, insertion logic 506, input simulation logic 508, class logic 510, behavior logic 512, stub code mock logic 514, SerDes logic 516, flowchart 200 (including any step of flowchart 200), flowchart 300 (including any step of flowchart 300), and/or flowchart 400 (including any step of flowchart 400), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processing unit 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. Such computer-readable storage media are distinguished from and non-overlapping with communication media (do not include communication media).

Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to generate one or more mock-based unit tests for an end-to-end test of a code snippet, the system comprising:
   memory; and
   one or more processors coupled to the memory, the one or more processors configured to generate the one or more mock-based unit tests from one or more respective initial unit tests to exist concurrently with the one or more respective initial unit tests from which the one or more respective mock-based unit tests are generated and to cause the one or more mock-based unit tests to be capable of running independently from other unit tests of the end-to-end test during the end-to-end test by performing operations that include:
   replace one or more methods, which have a designated functionality, in the code snippet with a wrapper function that has the designated functionality;
   insert at least one of one or more shims or one or more stubs in the wrapper function to replace behavior of the one or more methods with regard to one or more callback methods from one or more dependencies of the one or more methods; and
   simulate inputs that are included in the one or more callback methods and that are intended for the code snippet to provide simulated inputs for the code snippet, the one or more mock-based unit tests configured to utilize (a) the wrapper function in lieu of the behavior of the one or more methods and (b) the simulated inputs in lieu of the inputs, the one or more initial unit tests configured to utilize (a) the behavior of the one or more methods rather than the wrapper function and (b) the inputs rather than the simulated inputs, the one or more mock-based unit tests and the one or more initial unit tests configured to call server-side code.

2. The system of claim 1, wherein the operations include:
   simulate behaviors of the one or more dependencies of the one or more methods, the one or more dependencies being external to the code snippet and end-to-end test code that is configured to perform the end-to-end test.

3. The system of claim 2, wherein the operations include:
   provide one or more sets of data structures for the one or more respective mock-based unit tests, each set of data structures configured to simulate the behaviors of the one or more dependencies.

4. The system of claim 1, wherein the operations include:
   serialize and de-serialize at least one simulated input that is included in the simulated inputs;
   cause the mocked stub code to call the mocked method in response to serialization and de-serialization of the at least one simulated input; and
   de-serialize and serialize a server-side output, which results from the mocked method being called, to provide a client-side output.

5. The system of claim 1, wherein the operations include:
   load and enumerate a shimmed type, which is associated with a web API class type, for each of the one or more methods, each shimmed type including properties that specify the respective method that is included in the one or more methods and a respective callback method that is included in the one or callback methods.

6. The system of claim 1, wherein the one or more callback methods include at least one callback method from a web service.

7. The system of claim 1, wherein the one or more callback methods include at least one callback method from a database.

8. The system of claim 1, wherein the operations include:
   define a data source class to encapsulate first code, which is used to simulate the inputs that are included in the one or more callback methods and that are intended for the code snippet, the data source class configured to isolate the first code from second code, which is used to insert the at least one of the one or more shims or the one or more stubs in the wrapper function.

9. A method of generating one or more mock-based unit tests for an end-to-end test of a code snippet, the method comprising:
   causing the one or more mock-based unit tests, which exist concurrently with one or more respective initial unit tests on which the one or more respective mock-based unit tests are based, to be capable of running independently from other unit tests of the end-to-end test during the end-to-end test by performing operations comprising:

replacing one or more methods, which have a designated functionality, in the code snippet with a wrapper function that has the designated functionality;

inserting at least one of one or more shims or one or more stubs in the wrapper function to replace behavior of the one or more methods with regard to one or more callback methods from one or more dependencies of the one or more methods; and simulating inputs that are included in the one or more callback methods and that are intended for the code snippet to provide simulated inputs for the code snippet, the one or more mock-based unit tests configured to utilize (a) the wrapper function in lieu of the behavior of the one or more methods and (b) the simulated inputs in lieu of the inputs, the one or more initial unit tests configured to utilize (a) the behavior of the one or more methods rather than the wrapper function and (b) the inputs rather than the simulated inputs, the one or more mock-based unit tests and the one or more initial unit tests configured to call server-side code.

10. The method of claim 9, wherein the operations further comprise:

defining a data source class to encapsulate input simulation logic, which simulates the inputs that are included in the one or more callback methods and that are intended for the code snippet, the data source class configured to isolate the input simulation logic from insertion logic, which inserts the at least one of the one or more shims or the one or more stubs in the wrapper function.

11. The method of claim 9, wherein simulating the behaviors of the one or more dependencies comprises:

providing one or more sets of data structures for the one or more respective mock-based unit tests, each set of data structures configured to simulate the behaviors of the one or more dependencies.

12. The method of claim 9, wherein automatically generating the one or more mock-based unit tests comprises:

serializing and de-serializing at least one simulated input that is included in the simulated inputs;

causing the mocked stub code to call the mocked method in response to serializing and de-serializing the at least one simulated input; and de-serializing and serializing a server-side output, which results from the mocked method being called, to provide a client-side output.

13. The method of claim 9, wherein inserting the at least one of the one or more shims or the one or more stubs comprises:

loading and enumerating a shimmed type, which is associated with a web API class type, for each of the one or more methods, each shimmed type including properties that specify the respective method that is included in the one or more methods and a respective callback method that is included in the one or more callback methods.

14. The method of claim 9, wherein inserting the at least one of the one or more shims or the one or more stubs comprises:

inserting the at least one of the one or more shims or the one or more stubs in the wrapper function to replace the behavior of the one or more methods with regard to the one or more callback methods that include at least one callback method from at least one of a web service or a database.

15. The method of claim 9, wherein the operations further comprise:

simulating behaviors of the one or more dependencies of the one or more methods, the one or more dependencies being external to the code snippet and end-to-end test code that is configured to perform the end-to-end test, which includes a plurality of unit tests.

16. A computer program product comprising a computer-readable storage medium having instructions recorded thereon for enabling a processor-based system to perform operations, the operations comprising:

generate one or more mock-based unit tests from one or more respective initial unit tests of an end-to-end test of a code snippet, such that the one or more mock-based unit tests exist concurrently with the one or more respective initial unit tests from which the one or more respective mock-based unit tests are generated and such that the one or more mock-based unit tests are capable of running independently from other unit tests of the end-to-end test during the end-to-end test, by performing the following:

replace one or more methods, which have a designated functionality, in the code snippet with a wrapper function that has the designated functionality;

insert at least one of one or more shims or one or more stubs in the wrapper function to replace behavior of the one or more methods with regard to one or more callback methods from one or more dependencies of the one or more methods; and simulate inputs that are included in the one or more callback methods and that are intended for the code snippet to provide simulated inputs for the code snippet, the one or more mock-based unit tests configured to utilize (a) the wrapper function in lieu of the behavior of the one or more methods and (b) the simulated inputs in lieu of the inputs, the one or more initial unit tests configured to utilize (a) the behavior of the one or more methods rather than the wrapper function and (b) the inputs rather than the simulated inputs, the one or more mock-based unit tests and the one or more initial unit tests configured to call server-side code.

17. The computer program product of claim 16, wherein the operations include:

generate the one or more mock-based unit tests by further performing the following:

define a data source class to encapsulate first code, which is used to simulate the inputs that are included in the one or more callback methods and that are intended for the code snippet, the data source class configured to isolate the first code from second code, which is used to insert the at least one of the one or more shims or the one or more stubs in the wrapper function.

18. The computer program product of claim 16, wherein the operations include:

generate the one or more mock-based unit tests by further performing the following:

simulate behaviors of the one or more dependencies of the one or more methods, the one or more dependencies being external to the code snippet and end-to-end test code that is configured to perform the end-to-end test, which includes a plurality of unit tests.

19. The computer program product of claim 18, wherein the operations include:
   generate the one or more mock-based unit tests by further performing the following:
      provide one or more sets of data structures for the one or more respective mock-based unit tests, each set of data structures configured to simulate the behaviors of the one or more dependencies.

20. The computer program product of claim 16, wherein the operations include:
   generate the one or more mock-based unit tests by further performing the following:
      serialize and de-serialize at least one simulated input that is included in the simulated inputs;
      cause the mocked stub code to call the mocked method in response to serialization and de-serialization of the at least one simulated input; and
      de-serialize and serialize a server-side output, which results from the mocked method being called, to provide a client-side output.

* * * * *